(12) United States Patent
McSchooler

(10) Patent No.: US 10,057,407 B2
(45) Date of Patent: *Aug. 21, 2018

(54) IN-VEHICLE MOBILE DEVICE DISTRACTED DRIVER CONTROL

(71) Applicant: DISH Technologies L.L.C., Englewood, CO (US)

(72) Inventor: Jeffrey McSchooler, Parker, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/815,382

(22) Filed: Nov. 16, 2017

(65) Prior Publication Data

US 2018/0183923 A1 Jun. 28, 2018

Related U.S. Application Data

(63) Continuation of application No. 15/389,944, filed on Dec. 23, 2016, now Pat. No. 9,854,086.

(51) Int. Cl.
*H04W 24/00* (2009.01)
*H04M 1/725* (2006.01)
*H04W 4/04* (2009.01)

(52) U.S. Cl.
CPC ... *H04M 1/72577* (2013.01); *H04M 1/72569* (2013.01); *H04M 1/72572* (2013.01); *H04W 4/046* (2013.01)

(58) Field of Classification Search
CPC . H04W 64/00; H04W 64/003; H04W 64/006; H04W 4/02; H04W 4/026; H04W 4/027; H04W 88/02; H04W 70/408; H04W 70/468; H04W 70/469; H04W 70/50; H04W 70/507
USPC ............... 455/456.1, 456.6, 550.1, 556.1
See application file for complete search history.

(56) References Cited

U.S. PATENT DOCUMENTS

| | | | |
|---|---|---|---|
| 9,148,762 | B2 | 9/2015 | Taylor |
| 9,258,409 | B1 | 2/2016 | Barfield, Jr. et al. |
| 9,307,071 | B2 | 4/2016 | Neitzel et al. |
| 9,854,086 | B1 | 12/2017 | McSchooler |
| 2012/0071151 | A1 | 3/2012 | Abramson et al. |
| 2012/0129460 | A1 | 5/2012 | Hodis et al. |
| 2013/0281079 | A1* | 10/2013 | Vidal ............... H04W 8/22 455/418 |

(Continued)

OTHER PUBLICATIONS

U.S. Appl. No. 15/389,944, filed Dec. 23, 2016, Non-Final Rejection dated Apr. 7, 2017, all pages.

(Continued)

*Primary Examiner* — Temica M Beamer
(74) *Attorney, Agent, or Firm* — Kilpatrick Townsend & Stockton, LLP

(57) ABSTRACT

Various arrangements for restricting mobile device usage are presented. A mobile device may collect movement and location sensor data. An in-vehicle mobile device usage profile may be created based on the sensor data and the collected user interaction data. The in-vehicle mobile device usage profile may be analyzed to determine that a user of the mobile device is currently an operator of the moving vehicle. In response to determining that the user of the mobile device is currently the operator of the moving vehicle, access to one or more functions of the mobile device may be restricted.

16 Claims, 6 Drawing Sheets

(56) References Cited

U.S. PATENT DOCUMENTS

| | | |
|---|---|---|
| 2016/0006861 A1 | 1/2016 | Hodges et al. |
| 2016/0044575 A1* | 2/2016 | Rajeevalochana .... H04W 4/027 455/410 |
| 2016/0061625 A1 | 3/2016 | Wang |
| 2016/0088469 A1 | 3/2016 | Racha et al. |
| 2016/0227020 A1* | 8/2016 | Tadayon ................. H04M 3/53 |

OTHER PUBLICATIONS

U.S. Appl. No. 15/389,944, filed Dec. 23, 2016, Notice of Allowance dated Aug. 28, 2017, all pages.
International Search Report and Written Opinion for PCT/US2017/063556, dated Feb. 13, 2018, all pages.

\* cited by examiner

IN-VEHICLE MOBILE DEVICE DISTRACTED DRIVER CONTROL

CROSS-REFERENCES TO RELATED APPLICATIONS

This Application is a continuation of U.S. patent application Ser. No. 15/389,944, filed Dec. 23, 2016, entitled "IN-VEHICLE MOBILE DEVICE DISTRACTED DRIVER CONTROL", the entire disclosure of which is hereby incorporated by reference for all purposes.

BACKGROUND

Mobile device usage while driving has become a significant source of danger on the roadways. "Driving while distracted," which is typically due to mobile device usage, causes many vehicular accidents and deaths each year. According to the Center for Disease Control and Prevention (CDC), each day in the United States, over 8 people are killed and 1,161 injured in vehicular crashes that involve a distracted driver. While such mobile device usage is illegal in many states and most drivers know of the danger, incoming messages, boredom, and poor impulse control lead many drivers to risk their safety and the safety of motorists and pedestrians nearby by diverting their attention from the road to their devices.

SUMMARY

Various methods, systems, devices, and non-transitory processor-readable mediums for restricting mobile device usage are presented. A mobile device may collect sensor data from at least one of a movement sensor and a location sensor. The mobile device may determine that the mobile device is being operated within a moving vehicle based on the sensor data. In response to determining that the mobile device is being operated within the moving vehicle based on the sensor data, the mobile device may collect user interaction data indicative of a user's interactions with the mobile device while the mobile device is being operated within the moving vehicle. The mobile device may create a movement profile based on the sensor data. The mobile device may create a mobile device usage profile using the collected user interaction data. The mobile device usage profile and the movement profile may be analyzed. It may be determined that a user of the mobile device is an operator of the moving vehicle based on analysis of the mobile device usage profile and the movement profile. In response to determining that the user of the mobile device is currently the operator of the moving vehicle, access to one or more functions of the mobile device may be restricted.

Embodiments of such methods, systems, devices, and non-transitory processor-readable mediums for restricting mobile device usage may include one or more of the following features: The movement profile may indicate times at which a plurality of movement events of the mobile device occurred within a time window. The mobile device usage profile may indicate times at which a plurality of user usage events occurred within the time window. Analyzing the mobile device usage profile may include determining that a user usage event of the plurality of user usage events occurred distinct from a movement event of the plurality of movement events. Analyzing the mobile device usage profile may include computing a point score based on the mobile device usage profile. Determining that the user of the mobile device is currently the operator of the moving vehicle may include comparing the computed point score with an operator threshold. A definition of a local mobile device usage law may be accessed that applies to drivers based on the sensor data. Restricting access to the one or more functions of the mobile device may be performed in compliance with the local mobile device usage law.

DETAILED DESCRIPTION

Figure 1:
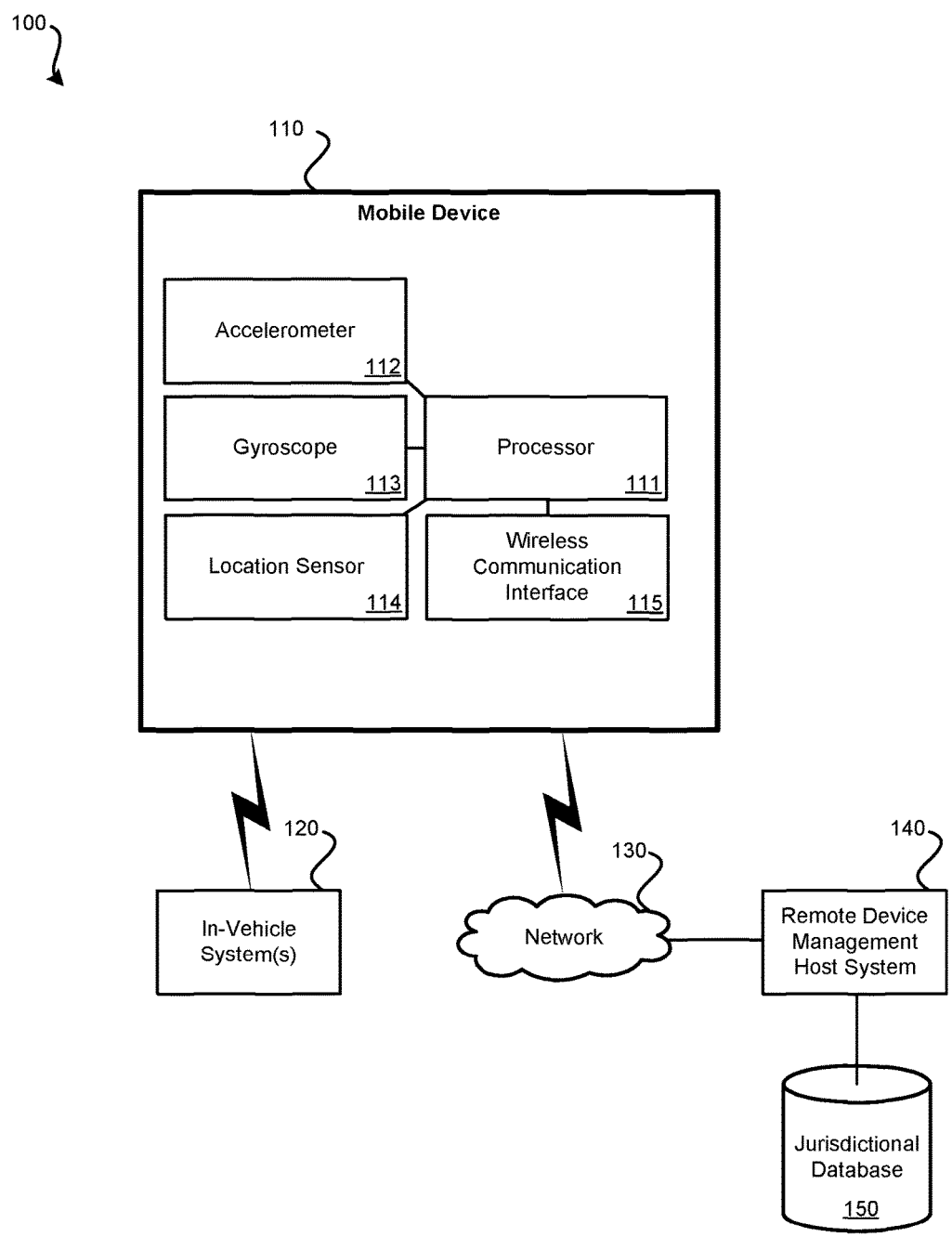
FIG. 1 illustrates an embodiment of a mobile device and vehicle system.

Despite mobile device (e.g., mobile phone) usage being dangerous and possibly illegal for a driver, there is no prohibition or significant safety issue that prevents vehicular passengers from using mobile devices. As detailed herein, a mobile device may be able to disable some or all functionality based on determining that not only is the mobile device within an operating vehicle (e.g., car, truck, bus, motorcycle), but also that the user of the mobile device is the vehicle's driver.

To assess whether the user of the mobile device is the driver, data gathered by the mobile device using a location sensor (e.g., GPS sensor) and/or movement sensor (e.g., gyroscope, accelerometer) may be used to profile the user's usage pattern based on the user's interactions with the mobile device (e.g., providing any sort of input to the mobile device). While a passenger's usage may not correlate closely with the movement of the vehicle, a driver's usage of a mobile device may be greatest during times when the vehicle is: stopped, being operated below a threshold velocity, travelling roughly in a straight line, and/or is travelling at a near constant speed (e.g., cruising on the highway). A driver's mobile device usage may be less when the vehicle is accelerating, decelerating, turning, and/or the vehicle is being operated at above a threshold velocity. Therefore, when a mobile device is determined to be in a vehicle, a comparison between a movement profile of the mobile device and a usage profile of the mobile device may be made to determine if the user of the mobile device is likely a driver of the vehicle.

The assessment as to whether the mobile device is being operated by a driver may be made by an operating system of the mobile device, resulting in certain basic functionality of the mobile device being disabled, such as the display of email and text messages, the delivery of notifications, the ability to execute applications, and/or web browsing. In some embodiments, individual applications may perform the assessment and disable their functionality if a user attempts to interact with the application. For example, a video viewing application may display a message saying "video output not available during vehicular operation" in lieu of outputting a requested video. Alternatively, the application or operating system may request that a user attest that the user is not operating a vehicle by providing input (e.g., a swipe) if the application or operating system determines that such usage is likely occurring.

In some embodiments, since the mobile device can determine its location using a location sensor, the mobile device may be able to enforce or suggest compliance with local law. For example, if a jurisdiction prohibits mobile device usage while a vehicle is being operated, the mobile device may enforce such a prohibition while within the jurisdiction. If the mobile device moves into another jurisdiction (e.g., one that prohibits usage only while the vehicle is in motion or has no prohibition on mobile device usage), the mobile device may then permit usage that complies with such local law.

In some embodiments, the mobile device may communicate with the vehicle and/or an insurance carrier's in-vehicle device to enhance functionality. For example, the vehicle may transmit an indication of the vehicle's transmission state (e.g., park, drive) to the mobile device. This state can be used to assess whether functionality of the mobile device is to be restricted. Additionally or alternatively, the mobile device may report data to an in-vehicle device of an insurance carrier. For example, if the mobile device restricts functionality and the user performs an override (e.g., by performing a gesture that attests that the user is not operating the vehicle or is aware of the risks), the insurance device may receive and store a time-stamped indication of the usage event, which could be useful for insurance rate setting and/or if an accident occurs.

FIG. 1 illustrates an embodiment of a mobile device and vehicle system 100. System 100 may include mobile device 110, one or more in-vehicle systems 120, network 130, remote device management host system 140, and jurisdictional database 150. Mobile device 110 may commonly represent a smartphone or other form of cellular phone operated by a user. In other embodiments, mobile device 110 may represent a tablet computer, laptop computer, or other computerized device that a user may attempt to operate while driving a vehicle. Mobile device 110 may include at least some of the following components: processor 111, accelerometer 112, gyroscope 113, location sensor 114, and wireless communication interface 115.

Processor 111 may be in communication with components 112 through 115. Processor 111 may execute various components which are explained in further detail in relation to FIG. 2. While a single processor 111 is illustrated in FIG. 1, it should be understood that multiple processors may be used in other embodiments.

Accelerometer 112 may represent an onboard acceleration sensor that can determine an amount of acceleration of mobile device 110 and a direction of the acceleration. Gyroscope 113 may be used to determine an orientation of mobile device 110. Location sensor 114 may include a global navigation satellite system (GNSS) sensor, which may typically be a global positioning system (GPS) sensor. Location sensor 114 may be used for determining an absolute location of mobile device 110, a velocity, an acceleration, and direction of movement. Wireless communication interface 115 may allow mobile device 110 to communicate wirelessly with one or more other computerized devices, either located within the vehicle or external to the vehicle. For example, wireless communication interface 115 may include a cellular network communication interface that allows mobile device 110 to communicate with network 130, which can include a wireless service provider's cellular network. Wireless communication interface 115 may also include a component that allows mobile device 110 to communicate with one or more in-vehicle systems, such as via Bluetooth or some other local wireless communication protocol.

In-vehicle systems 120 may include a vehicle's on-board diagnostics system, which can report to him and mobile device 110 operating characteristics of the vehicle, such as the vehicle's transmission state (e.g., park, drive, neutral), the vehicle's speed, the vehicles acceleration, and/or whether the vehicle is turning. Another in-vehicle system 120 may include an insurance monitoring device. Mobile device 110 may transmit data to the insurance monitoring device indicating that the mobile device has been restricted due to the vehicle's driver attempting to use it and/or that the driver has overridden restriction of the mobile device. In other embodiments, such data may be reported directly to an insurance carrier via network 130.

Mobile device 110 may be able to communicate wirelessly with network 130. Network 130 may include one or more public and/or private networks, such as a cellular service provider's cellular network and/or the Internet. Network 130 may enable mobile device 110 to communicate with a remote device management host system 140.

Remote device management host system 140 may provide various services to mobile device 110, such as map services and/or jurisdictional compliance information. Map services provided to mobile device 110 may allow mobile device 110 to determine if mobile device 110 is likely in a vehicle being operated on public roads. Jurisdictional compliance information may be stored in jurisdictional database 150. Based upon a location of mobile device 110, functions of mobile device 110 may be disabled to comply with local law. For example, if mobile device 110 is determined to be operated by a vehicle's operator (driver) in a jurisdiction that prohibits such behavior according to data stored in jurisdictional database 150, one or more functions of mobile device 110 may be disabled. However, as another example, if mobile device 110 is determined to be operated by driver in a jurisdiction that does not prohibit such behavior according to data stored in jurisdictional database 150, no functions of mobile device 110 may be disabled. As a final example, another jurisdiction may only prohibit text messaging but may permit phone calls. Data retrieved from jurisdictional database 150 and provided to mobile device 110 may enforce such a restriction. In other embodiments, jurisdictional database 150 is stored locally by mobile device 110.

Figure 2:
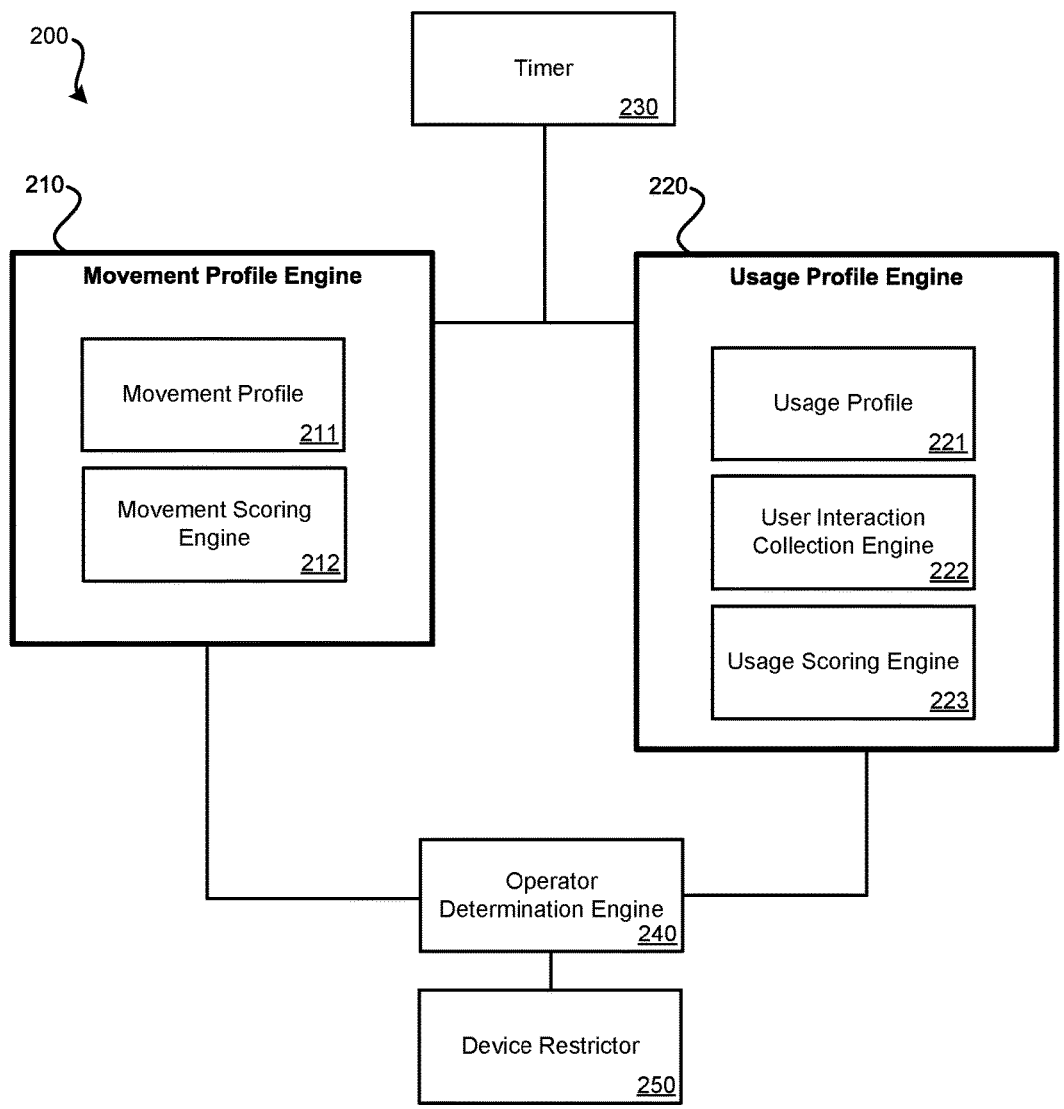
FIG. 2 illustrates an embodiment of a profile-based vehicle operator identification system that can be incorporated as part of a mobile device.

FIG. 2 illustrates an embodiment of a profile-based vehicle operator identification system 200 that can be incorporated as part of a mobile device. System 200 may be executed by mobile device 110 using one or more processors, such as processor 111. System 200 may be incorporated as part of an operating system of mobile device 110. In other embodiments, system 200 may be incorporated as part of an application installed on and executed by mobile device 110; in such an embodiment, system 200 may only restrict access to the application in which it is incorporated. In still other embodiments, system 200 may be a stand-alone application that can restrict access to other applications and features of the mobile device. In yet other embodiments, system 200 may be implemented using one or more special-purpose processors, thus using hardware to directly implement the functionality of system 200. Whether implemented directly as hardware or as software executed by underlying hardware, system 200 may include: movement profile engine 210, usage profile engine 220, timer 230, operator determination engine 240, and device restrictor 250.

Movement profile engine 210 may be executed using one or more processors, such as processor 111 of mobile device 110. Movement profile engine 210 may serve to monitor and record notable movement of the mobile device. This information may be used to assess whether the mobile device is within an operating vehicle and, if so, monitor movement of the mobile device, which will be roughly reflective of movement of the vehicle, for use in determining if the mobile device is being operated by a driver of the vehicle.

Movement profile engine 210 may include movement profile 211 and movement scoring engine 212. Movement profile engine 210 may create movement profile 211. Movement profile 211 may define a rolling time window of movement data for the mobile device. Movement profile 211 may include acceleration events and velocity data. Acceleration events may include changes in acceleration of mobile device 110 and/or changes in direction of movement of mobile device 110. That is, the acceleration data may be directional. Movement profile 211 may further include timing information derived from timer 230. When acceleration event occurs, a time of the acceleration event, which may include a start time and finish time, may be stored in association with the acceleration data as part of movement profile 211. Similar information may be stored for velocity. For example, a velocity event may indicate a start and stop time during which the mobile device was moving in average velocity. In some embodiments, velocity events are grouped into various buckets, such as low velocity, medium velocity, and high velocity. Low velocity may be below, for example, 20 mph, medium velocity may be between 20 and 40 mph, and high velocity may be about 40 miles per hour. Similar distinctions may be made for acceleration data.

Movement profile engine 210 may only store data to movement profile 211 if movement profile engine 210 determines that mobile device 110 is likely in an operating vehicle. This determination may be based on a location of the mobile device as determined using location sensor 114, data retrieved from an onboard vehicle diagnostic system, acceleration data, and/or velocity data. For example, if mobile device 110 is determined to move above a threshold velocity and/or is connect with a wireless interface of the vehicle, it may be determined that the mobile device is likely in an operating and/or moving vehicle. Only events that represent significant movement (e.g., as compared to a set of rules or thresholds) may be classified as movement events and stored within movement profile 211. Therefore, small movements of the mobile device (such as a user picking up the mobile device) may be insufficient for a movement event to be recorded to movement profile 211.

Movement scoring engine 212 may score various movement events stored as part of movement profile 211. The various values may be assigned to various types of direction change events, acceleration events, and velocity events. Scores may be based on various rules and parameters maintained within movement scoring engine 212. For example, a fast acceleration (above a first defined threshold) or fast deceleration (below a second defined threshold but greater than zero) may be attributed with a higher score than a slow acceleration (below the first defined threshold) or slow deceleration (above the second defined threshold but less than zero). The scoring performed by movement scoring engine 212 may be used to assess a likelihood that the mobile device is being operated by the vehicle's driver. In the sample excerpt, the more negative of a number is indicative of a driver being less likely to be the user using the mobile device. An excerpt from movement profile 211 as created by movement profile engine 210 with scoring conducted by movement scoring engine 212 is illustrated in Table 1. Movement profile 211 may only be stored for a rolling window of time, such as the previous 20 minutes. In some embodiments, rather than a rolling time window, movement data may be collected and stored for a fixed window of time once the mobile device has been determined to be in a moving or operating vehicle.

TABLE 1

| Event Type | Event | Time | Event Score |
|---|---|---|---|
| Acceleration | ~2.68 m/s² for 10 s | 4:27:12-4:27:22 | −4 |
| Velocity | ~26.8 m/s for >1 m | 4:28:00 | −1 |
| Turning | ~10 degrees/s for 6 s | 4:29:01-4:29:07 | −3 |
| Velocity | ~8 m/s for >1 m | 4:31:59 | −1 |
| Acceleration | ~1.4 m/s² for 7 s | 4:33:12-4:33:19 | −2 |
| Vehicle at Stop | 0 mph for 30 s | 4:37:00-4:37:30 | 2 |

Referring to Table 1, the score used for other times (that is, times not corresponding to an event), may be given a default score of 1 or some other value.

Usage profile engine 220 may include: usage profile 221, user interaction collection engine 222, and usage scoring engine 223. Usage profile engine 220 may create usage profile 221 for a rolling window of time when movement profile engine 210 has determined that mobile device 110 is determined to be operated within an operating vehicle. At other times, usage profile engine 220 may be disabled such that usage profile 221 is not created when mobile device 110 is determined to be used outside of an operating or moving vehicle. Usage profile 221 may be created for the same rolling window of time as movement profile 211.

User interaction collection engine 222 may monitor for interactions performed by a user with mobile device 110. Such interactions can include: typing, button presses (e.g., to enable/disable a touchscreen or lock/unlock the mobile device), gestures (e.g., swipes), touches, a pickup or put-down of the mobile device (measured based on accelerometer and/or gyroscope measurements), etc. User interaction collection engine 222 may collect each of these interactions for a rolling window of time to allow usage profile engine 220 to record such interactions with additional data to usage profile 221. In some embodiments, rather than a rolling time window, user interactions are collected for a fixed window of time once the mobile device has been determined to be in a moving or operating vehicle. A time obtained from timer 230 may also be recorded to usage profile 221 for each recorded interaction by usage profile engine 220. Therefore, usage profile 221 may store indications of various user inputs and associated times of such interactions.

Usage scoring engine 223 may serve to score various user interactions. Scoring may be based on the amount of visual interaction with the mobile device required for the task. For instance, typing (e.g., letter or number input), a high score may be assigned since a user likely needs to be viewing the device to perform such a function. A gesture, such as a swipe, may receive a lower score, and a button press, such as to lock or unlock the device, may receive a still lower score, since a user could be locking or unlocking the device by feeling the button and not looking at the device. Usage scoring engine 223 may use defined rules or scoring parameters to determine a score for each user interaction in the rolling window of time. Other factors that can be considered by usage scoring engine 223 may include: the application currently active, the rate of typing, whether typing input is several letters at a time followed by a significant pause (e.g., >1's) (which could be indicative of a user trying to type and watch traffic at the same time), the duration of user interaction with the mobile device, etc. Table 2 below indicates a sample portion of usage profile 221 with various scores assigned to user actions.

TABLE 2

| Usage Event Number | Usage Type | Usage | Time | Usage Score |
|---|---|---|---|---|
| 0 | Typing | Fast, 6 s | 4:27:30-4:27:36 | 5 |
| 1 | Gesture | Swipe | 4:28:05 | 2 |
| 2 | Typing | Intermittent, 10 s | 4:29:14-4:29:24 | 4 |
| 3 | Application Launch | Touch | 4:32:07 | 3 |
| 4 | Device Unlock | Button press | 4:33:17 | 1 |
| 5 | Typing | Fast, 5 s | 4:37:10 | 5 |

For the rolling window of time, a maximum number of events may be maintained, such as 50, or all events that occurred within the rolling window of time may be maintained Operator determination engine 240 can use movement profile 211 as created and maintained by movement profile engine 210 and usage profile 221 as created and maintained by usage profile engine 220 to determine whether a mobile device user is likely a vehicle operator (e.g., driver) or merely a passenger. Operator determination engine 240 may evaluate an algorithm that determines whether a mobile device user is likely a vehicle's driver based on whether user interactions are performed while the vehicle is undergoing operation that typically involves the driver paying close attention to the road and his surroundings, such as turning, accelerating, decelerating, and operating above a threshold velocity. If usage of the mobile device, especially usage that typically requires visual interaction with the mobile device (e.g., typing) correlates to times when the vehicle is not undergoing such intensive operation, it is more likely that the mobile device's user is a driver than if the usage of the mobile device occurs irrespective of such intensive operation. Therefore, operator determination engine 240 can compute a score that can be compared to a threshold for making a judgment as to whether a mobile device's user is a driver or not. Equation 1 provides an exemplary way of computing the overall score using movement profile 211 and usage profile 221.

$$\text{Operator Determination Score} = \sum_{usage\ event=0}^{49} (usage\ score)(event\ score) \quad \text{Eq. 1}$$

In the example of Equation 1, the previous 50 usage events that occur within the rolling or fixed time window may be evaluated. This number of usage events is merely exemplary. In other embodiments, all usage events within the time window may be evaluated. For each usage event within the usage profile, the usage score of the event may be multiplied by the event score. The event score may be obtained from movement profile 211 if an event corresponding in time is available. If an event in movement profile 211 is not corresponding in time with the usage event, a default value of 1 (or some other value) may be used for the event score. The default value may be positive to indicate that since the vehicle is not undergoing intensive operation, the mobile device usage could be reasonably performed by a driver. In the example of Table 1, negative values are assigned to events in movement profile 211 that require concentration on driving from the vehicle's driver. Therefore, if a usage event occurs during or overlaps a movement event having a negative score, the operator determination score may be decreased (indicative of it being less likely that the mobile device user is the driver) and if the usage event occurs outside a movement event or during a movement event having a positive score (indicative of a driving event that does not require significant concentration from the driver), the operator determination score will increase (indicative of it being more likely that the mobile device user is the vehicle's driver). For example, if a user is typing while the vehicle is accelerating, this may be highly indicative that the mobile device user is a passenger and not the driver. However, if usage events are concentrated when the vehicle is not undergoing an event type associated with a negative score, this may be indicative of the mobile device user being the vehicle's driver.

A summed value for the operator determination score may be computed by operator determination engine 240. This calculated value may be compared to a stored threshold value. This threshold value can be set high to decrease "false alarms" of a user being identified as a driver or set lower to increase the likelihood that a driver is identified. In some embodiments, a user of the mobile device can configure the threshold. (User-based configuration may be particularly useful if the user objectively understands the importance of not using a mobile device while driving when evaluating the risks/benefits of mobile device usage at a time other than when actually driving, but the user is given to poor impulse control while actually driving.)

If the operator determination score is greater than the stored threshold value, the mobile device is determined to be used by a vehicle's operator; if less than the stored threshold value, the mobile device is determined to be used by a user other than the vehicle's operator. If a user is determined to be a vehicle's operator, the user may be blocked from using one or more features by device restrictor 250 until movement profile engine 210 determines the vehicle is no longer being operated (e.g., the vehicle's transmission is shifted to park, the vehicle leaves the public right-of-way, the mobile device disconnects from wireless interface of vehicle, the user provides input indicating that the vehicle is no longer being driven, the vehicle arrives at a stored destination such as work or a home, etc.). Device restrictor 250 may block or restrict access to one or more functions of the mobile device. For instance, the use of a touch-screen keyboard may be disabled, specific applications (e.g., a third-party application installed on the mobile device) or built-in functionality (e.g., text messaging) may be disabled, the device may not be eligible to be unlocked, or a warning message may be displayed that is required to be dismissed by the user. If the user is determined to be the driver and functionality of the device is blocked, in some embodiments, device restrictor 250 stores or transmits an indication that the vehicle driver is attempting to use his mobile device while driving.

It should be understood that the algorithm and scoring arrangements detailed in relation to FIG. 2, Tables 1 and 2, Equation 1, and operator determination engine 240 are merely examples. Movement data of the vehicle and usage data of the mobile device can be combined and evaluated in innumerable ways to determine whether the mobile device's operator is likely the vehicle's operator. For instance, a key characteristic that may be monitored for is whether a mobile device usage event that requires looking at the mobile device (e.g., typing) occurs when the vehicle is undergoing a movement event that requires a driver to be looking at traffic and road conditions (such as braking, accelerating, high-speed driving, or turning). If at least some of such events occur at substantially the same time or within the a threshold period of time, the likelihood that a user of the mobile device is the vehicle's driver is lower than if such events tend to more frequently occur at distinct times.

Figure 3:
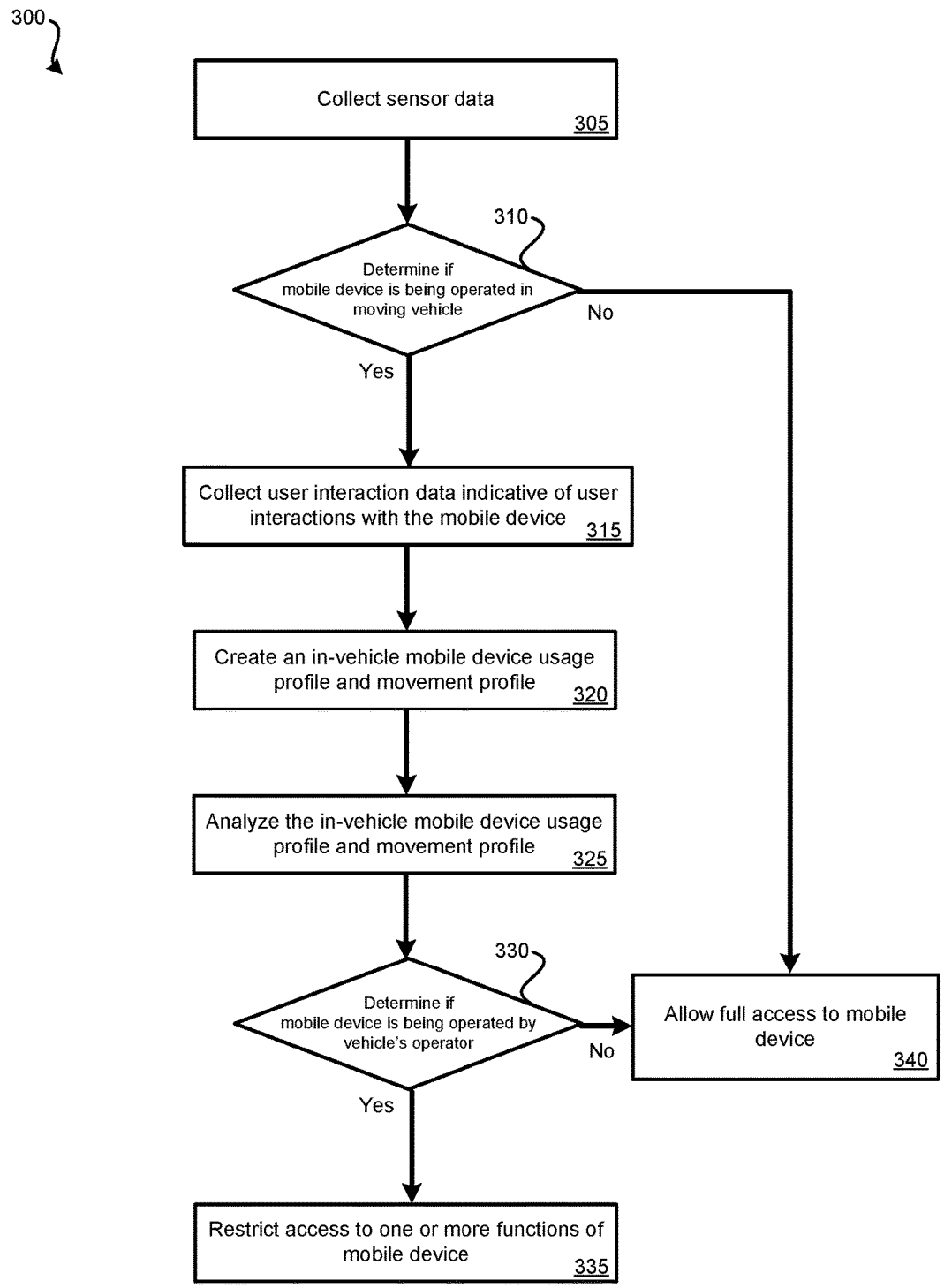
FIG. 3 illustrates an embodiment of a method for restricting mobile device usage.

Various methods may be performed using the systems of FIGS. 1 and 2. FIG. 3 illustrates an embodiment of a method 300 for restricting mobile device usage. Each block of method 300 may be performed by a mobile device, such as a smartphone. More specifically, method 300 may be performed using systems 100 and 200 of FIGS. 1 and 2, respectively. In some embodiments, various blocks may be performed by a remote system, such as a remote device management host system remote from the mobile device.

At block 305, the mobile device may collect sensor data from one or more sensors, including location sensors and/or movement sensors. Sensor data collected may include acceleration data (e.g., from an accelerometer), rotation data (e.g., from a gyroscope), and absolute location data (e.g., from a GPS sensor). At block 310, based on the collected sensor data, and possibly additional data, such as from a maps database or wireless interface, a determination may be made as to whether the mobile device is within an operating or moving vehicle. This determination may be made based on velocity, acceleration, and/or location. For instance, if the mobile device is moving along a road (e.g., according to map data) at a speed greater than 15 mph (e.g., from a location sensor or accelerometer), it may be determined that the mobile device is likely operating within a moving/operating vehicle. Alternate evaluations may be performed to determine if the mobile device is within an operating vehicle, such as if the mobile device is wirelessly connected with a vehicle's on-board media system (e.g., via a Bluetooth communication link) or an insurance provider's device, or if the vehicle provides data to the mobile device indicating that the vehicle's transmission is in drive. If a determination is made at block 310 that the mobile device is not being operated in a moving vehicle, method 300 may proceed to block 340 and, thus, may allow full access to functionality of the mobile device. In such a scenario, block 310 may be periodically reevaluated to determine if the mobile device is being used in an operating vehicle. Otherwise, at block 310, if it is determined that the mobile device as being operated in a moving or operating vehicle, method 300 may proceed to block 315.

At block 315, user interaction data may be collected that is indicative of a user's interactions with the mobile device. These user interactions may be stored along with timestamps indicative of the user interactions to a usage profile. Also at block 315, movement data from various sensors may continue to be collected and may be used to create a movement profile of the mobile device. This movement profile may be indicative of the vehicle's movements. Data stored to the movement profile may also be time stamped. In some embodiments, rather than creating separate usage profiles and movement profiles, a single profile may be created using similar data.

At block 325, the usage profile and movement profiles may be analyzed. For example, scoring may be performed at block 325 as detailed in relation to FIG. 2, and, specifically, Table 1, Table 2 and Equation 1. It should be understood, however, that various other types of analysis may be performed using the movement profile and usage profile.

At block 330, using the analyzed data of block 325, it may be determined if the mobile device is likely being operated by a vehicle's driver or by a passenger. The determination of block 330 may be performed by comparing a value computed at block 325 with the threshold value. For example, referring to Equation 1, the operator determination score may be compared with a threshold determination score to assess whether the user of the mobile device is likely a driver or passenger. In the example of Equation 1, if the threshold value is exceeded, the user is determined to be the driver; if the threshold value is not exceeded, the user is determined to be a passenger. In other embodiments, the determination of block 330 may be performed using some arrangement other than a threshold-based determination. Once the assessment of block 330 is completed, block 330 may not be reevaluated until the mobile device determines it has stopped travelling within an operating/moving vehicle and a new trip has begun (a driver and passenger are unlikely to switch roles while the vehicle is operating). In other embodiments, block 330 may be periodically reevaluated as new collected data is added to the profiles to reassess whether the user is likely the driver or passenger of the moving vehicle.

If at block 330 it is determined that the mobile device is being operated by someone other than the vehicle's operator, method 300 may proceed to block 340 and allow full access to the functionality of the mobile device. If method 300 proceeds to block 340, method 300 may be periodically reevaluated to reassess whether the mobile device as being operated within a vehicle and if the operator of the mobile device is likely the operator of the vehicle or may not be reevaluated until it is determined that the vehicle is no longer being operated or moving and that a new trip has begun. If at block 330 it is determined that the mobile device as being operated by the vehicle's driver, method 300 may proceed to block 335. At block 335, access to one or more functions of the mobile device may be restricted. This restriction may occur until block 310 is reevaluated and it is determined that the moving vehicle is no longer moving or being operated.

Figure 5:
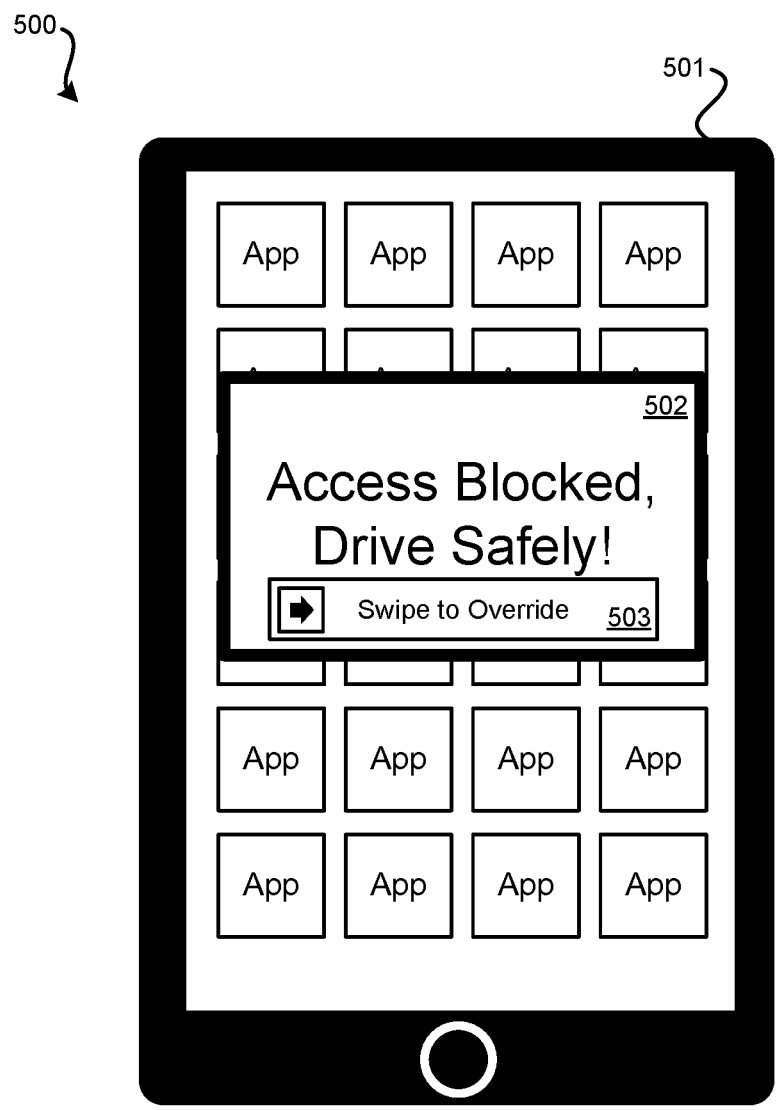
FIG. 5 illustrates an embodiment of a mobile device that has functionality disabled due to determining that a driver of a vehicle is the operator of the mobile device.

If block 335 is executed as part of method 300, the mobile device may present an interface such as that presented in FIG. 5. FIG. 5 illustrates an embodiment 500 of a mobile device 501 that has functionality disabled due to determining that a driver of a vehicle is the operator of the mobile device. In embodiment 500, a pop-up window 502 is presented that informs the user that at least some functionality of the mobile device has been restricted. In the illustrated embodiment 500 of FIG. 5, a user of the mobile device can perform a gesture via swipe interface 503 to override the restriction. In other embodiments, the ability to override the restriction may be unavailable. If the user elects to override the restriction, the mobile device 501 may record and/or transmit an indication of the user having provided the override input such as to a system of an insurance provider or provider of system 200. It should be understood that the arrangement of embodiment 500 is merely exemplary, and restriction to functionality of mobile device 501 may be performed in a variety of ways.

Figure 4:
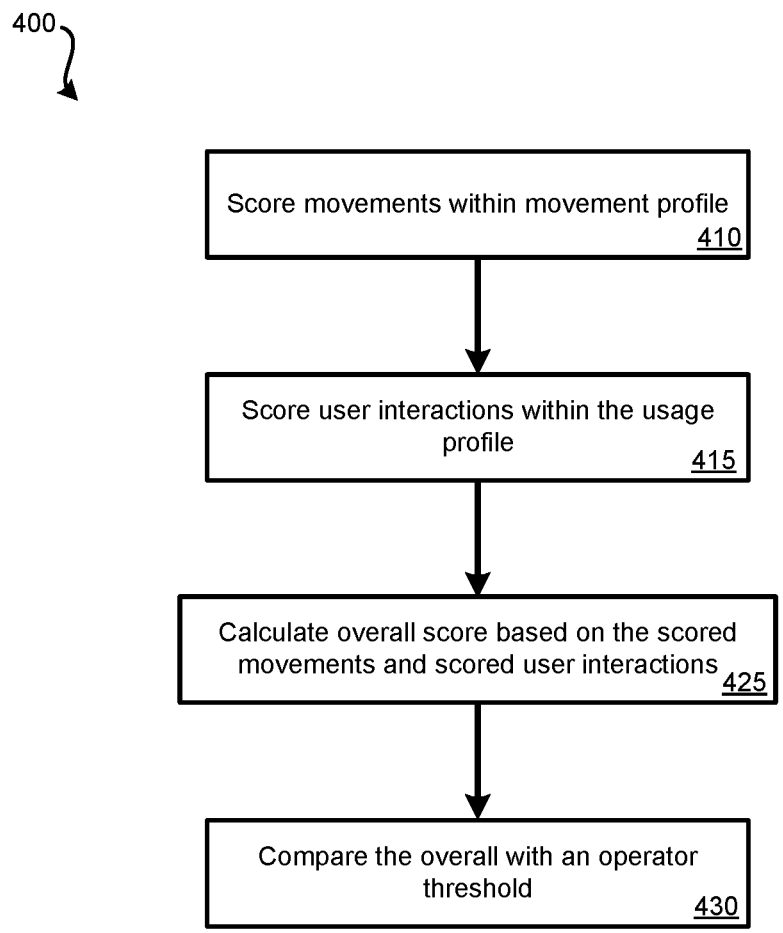
FIG. 4 illustrates an embodiment of a method using user interaction scoring for restricting mobile device usage.

FIG. 4 illustrates an embodiment of a method 400 using scoring for restricting mobile device usage. Method 400 may represent a more detailed embodiment of blocks 320 through 330 of method 300. Therefore, method 400 may be performed as part of method 300 if scoring is to be performed. Each block of method 400 may be performed by the mobile device, or in some embodiments various blocks may be performed by a remote system, such as a remote device management host system.

At block 410, movements that have been stored within the movement profile may be scored. Scoring may be based upon a set of rules or parameters that have been previously defined. For example, referring to the example of Table 1, movements that likely involve a driver needing to pay close attention to vehicular surroundings may be assigned a large negative number. As examples, acceleration above a threshold, deceleration below a threshold, turning (which can be included in acceleration), and a high vehicular velocity may have negative numbers. Movements that likely involve the driver not needing to pay attention to vehicular surroundings may be assigned a positive number. As examples, the vehicle being stationary or moving at a low speed in a straight line may have an associated positive score. For times that are associated with movement stored within movement profile, a default value may be used, such as 1.

At block 415, user interactions that have been stored within the usage profile may be scored. Scoring at block 415 may also be based upon a set of rules or parameters that have been previously defined. For example, referring to the example of Table 2, user interactions of the mobile device that likely involve a user needing to view screen of the mobile device may be assigned a large positive number. As examples, fast typing may be assigned a positive number. Intermittent typing may be assigned an even higher positive number due to the likelihood it is indicative of a user periodically looking away from the screen of the mobile device. As an additional example, gesture input or an application launch may be assigned a positive number that is not as large as typing (that is, a gesture may be performed while a driver's eyes remain on the road). Real-world testing may be used to determine specific point values that should be used during the scoring at block 410 and 415.

At block 425, an overall score may be calculated based on the various scored user interactions and the various scored movements within the usage profile and movement profile, respectively. For example, the overall score calculated at block 425 may be calculated according to Equation 1. At block 430, the overall score calculated at block 425 may be compared with an operator threshold. Based upon this comparison, it may be determined whether the mobile device user is likely also the vehicle's driver or is merely a passenger.

Figure 6:
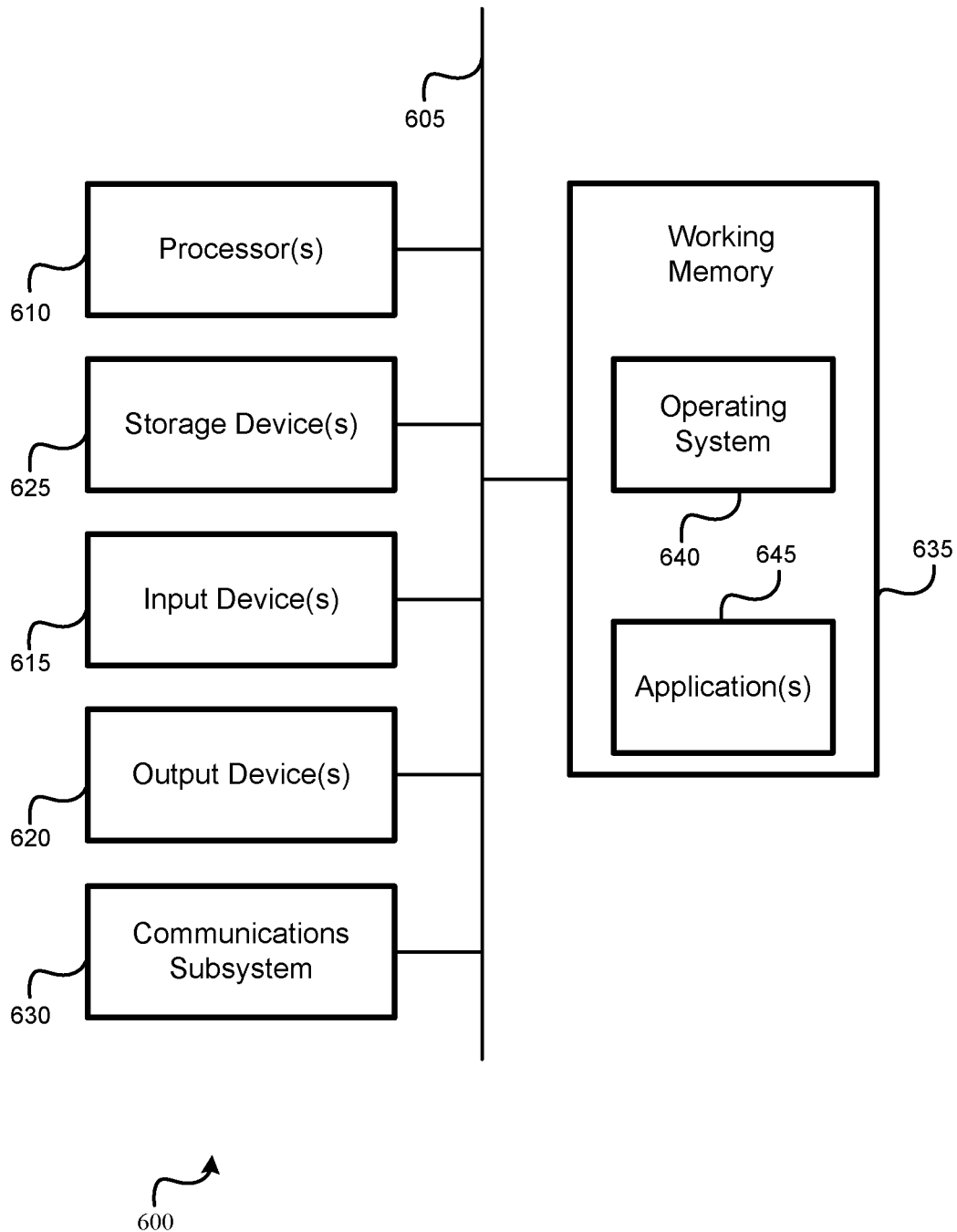
FIG. 6 illustrates an embodiment of a computer system that can be incorporated as part of the mobile device.

FIG. 6 illustrates an embodiment of a computer system 600 that can be incorporated as part of the mobile device, in-vehicle system, and/or remote device management host system. Referring to FIG. 2, system 200 may be implemented as instructions that are executed by computer system 600. FIG. 6 provides a schematic illustration of one embodiment of a computer system 600 that can perform various steps of the methods provided by various embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication). The hardware elements may include one or more processors 610, including, without limitation, one or more general-purpose processors and/or one or more special-purpose processors (such as digital signal processing chips, graphics acceleration processors, video decoders, and/or the like); one or more input devices 615, which can include, without limitation, a mouse, a touchscreen, keyboard, remote control, and/or the like; and one or more output devices 620, which can include, without limitation, a display device, a printer, etc.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including, without limitation, various file systems, database structures, and/or the like.

The computer system 600 might also include a communications subsystem 630, which can include, without limitation, a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 630 may permit data to be exchanged with a network (such as the network described below, to name one example), other computer systems, and/or any other devices described herein. In some embodiments, a tuner, such as a tuner that operates in accordance with the ATSC (Advanced Television Systems Committee) 3.0 standard may be used for receiving communications by computer system 600. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 625 described above. In some cases, the storage medium might be incorporated within a computer system, such as computer system 600. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the non-transitory storage device(s) 625. Merely by way of example, execution of the sequences of instructions contained in the working memory 635 might cause the processor(s) 610 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc., carried by the signals) to the working memory 635, from which the processor(s) 610 retrieves and executes the instructions. The instructions received by the working memory 635 may optionally be stored on a non-transitory storage device 625 either before or after execution by the processor(s) 610.

It should further be understood that the components of computer system 600 can be distributed across a network. For example, some processing may be performed in one location using a first processor while other processing may be performed by another processor remote from the first processor. Other components of computer system 600 may be similarly distributed. As such, computer system 600 may be interpreted as a distributed computing system that performs processing in multiple locations. In some instances, computer system 600 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for restricting mobile device usage, the method comprising:
  collecting, by a mobile device, user interaction data that is indicative of a user's interactions with the mobile device while the mobile device is being operated within a vehicle, wherein the user interaction data indicates a type of usage, the type of usage comprising: typing, a gesture input, an application launch, or a button press;

creating, by the mobile device, a mobile device usage profile using the collected user interaction data, wherein the mobile device usage profile links an interaction time with each instance of the user interaction data;

creating, by the mobile device, a movement profile of the mobile device based on sensor data of the mobile device, the movement profile of the mobile device being indicative of the mobile device's movement while the mobile device is being operated within the vehicle, wherein the mobile device movement profile links a movement time with each instance of movement;

assessing, by the mobile device, whether movement events within the movement profile correspond in time to user interactions indicated in the mobile device usage profile;

determining, by the mobile device, that the mobile device is being used within the vehicle by a driver of the vehicle based on assessing whether movement events within the movement profile correspond in time to user interactions indicated in the mobile device usage profile; and restricting, by the mobile device, access to one or more functions of the mobile device in response to determining that the mobile device is being used within the vehicle by the driver of the vehicle.

2. The method for restricting mobile device usage of claim 1, wherein assessing whether movement events within the movement profile correspond in time to user interactions indicated in the mobile device usage profile comprises determining that a user usage event occurred distinct from a movement event.

3. The method for restricting mobile device usage of claim 1, wherein determining that the mobile device is being used within the vehicle by the driver of the vehicle comprises:
calculating, by the mobile device, a score using the movement events within the movement profile and the mobile device usage profile.

4. The method for restricting mobile device usage of claim 3, wherein determining that the mobile device is being used within the vehicle by the driver comprises: comparing the calculated score with a stored threshold value.

5. The method for restricting mobile device usage of claim 1, further comprising:
determining, by the mobile device, that the mobile device is located within the vehicle based on GPS (Global Positioning System) data.

6. The method for restricting mobile device usage of claim 5, wherein creating the mobile device usage profile and the movement profile is performed based on determining that the mobile device is located within the vehicle based on the GPS data.

7. The method for restricting mobile device usage of claim 1, further comprising:
accessing, by the mobile device, a definition of a local mobile device usage law, wherein restricting access to the one or more functions of the mobile device is performed at least in part based on the local mobile device usage law.

8. A mobile device, comprising:
a user interface;
a movement sensor;
a location sensor;
one or more processors; and
a memory communicatively coupled with and readable by the one or more processors and having stored therein processor-readable instructions which, when executed by the one or more processors, cause the one or more processors to:
receive user interaction data from the user interface that is indicative of a user's interactions with the mobile device while the mobile device is being operated within a vehicle;
create a mobile device usage profile using the collected user interaction data, wherein the mobile device usage profile links an interaction time with each instance of the user interaction data;
create a movement profile of the mobile device based on data received from the movement sensor, location sensor, or both, the movement profile of the mobile device being indicative of the mobile device's movement while the mobile device is being operated within the vehicle, wherein the mobile device movement profile links a movement time with each instance of movement;
assess whether movement events within the movement profile correspond in time to user interactions indicated in the mobile device usage profile;
determine that the mobile device is being used within the vehicle by a driver of the vehicle based at least in part on assessing whether movement events within the movement profile correspond in time to user interactions indicated in the mobile device usage profile; and
restrict access to one or more functions of the mobile device in response to determining that the mobile device is being used within the vehicle by the driver of the vehicle.

9. The mobile device of claim 8, wherein the movement sensor is an accelerometer and the location sensor is a GPS (global positioning system) sensor.

10. The mobile device of claim 8, wherein the processor-readable instructions that, when executed, cause the one or more processors to assess whether movement events within the movement profile correspond in time to user interactions indicated in the mobile device usage profile comprise processor-readable instructions which, when executed, cause the one or more processors to determine that a user usage event occurred distinct from a movement event.

11. The mobile device of claim 8, wherein the processor-readable instructions, when executed, further cause the one or more processors to:
calculate a score using the movement events within the movement profile and the mobile device usage profile.

12. The mobile device of claim 11, wherein the processor-readable instructions that, when executed, cause the one or more processors to determine that the mobile device is being used within the vehicle by the driver of the vehicle comprise processor-readable instructions which, when executed, cause the one or more processors to compare the calculated score with a stored threshold value.

13. The mobile device of claim 8, wherein the processor-readable instructions, when executed, further cause the one or more processors to:
determine that the mobile device is located within the vehicle based on data from the location sensor.

14. The mobile device of claim 13, wherein the processor-readable instructions that, when executed, cause the one or more processors to create the mobile device usage profile and the movement profile is based on determining that the mobile device is located within the vehicle based on data from the location sensor.

15. The mobile device of claim 8, wherein the processor-readable instructions, when executed, further cause the one or more processors to:
   access a definition of a local mobile device usage law that applies to drivers based on data from the location sensor, wherein restricting the access to the one or more functions of the mobile device is performed in compliance with the local mobile device usage law.

16. A non-transitory processor-readable medium for executing by a mobile device, comprising processor-readable instructions that cause one or more processors to:
   receive user interaction data from a user interface of the mobile device that is indicative of a user's interactions with the mobile device while the mobile device is being operated within a vehicle;
   create a mobile device usage profile using the collected user interaction data, wherein the mobile device usage profile links an interaction time with each instance of the user interaction data;
   create a movement profile of the mobile device based on data received from a movement sensor, a location sensor, or both, the movement profile of the mobile device being indicative of the mobile device's movement while the mobile device is being operated within the vehicle, wherein the mobile device movement profile links a movement time with each instance of movement;
   assess whether movement events within the movement profile correspond in time to user interactions indicated in the mobile device usage profile;
   determine that the mobile device is being used within the vehicle by an occupant other than a driver of the vehicle based at least in part on assessing whether movement events within the movement profile correspond in time to user interactions indicated in the mobile device usage profile; and
   permit access to one or more functions of the mobile device in response to determining that the mobile device is being used within the vehicle by the driver of the vehicle.

* * * * *